(12) United States Patent
Randolph et al.

(10) Patent No.: US 6,501,599 B1
(45) Date of Patent: Dec. 31, 2002

(54) DOUBLE CONCAVE SCREEN AND METHOD OF ASSEMBLY

(76) Inventors: John William Randolph, 1051 Site Dr., Brea, CA (US) 92821; Roderick Ray Randolph, 2721 Skylark Cir., Costa Mesa, CA (US) 92626

( * ) Notice: Subject to any disclaimer, the term of this patent is extended or adjusted under 35 U.S.C. 154(b) by 0 days.

(21) Appl. No.: 09/930,824

(22) Filed: Aug. 14, 2001

(51) Int. Cl.$^7$ .............................................. G03B 21/56
(52) U.S. Cl. ..................................................... 359/451
(58) Field of Search .................................. 359/443, 451

(56) References Cited

U.S. PATENT DOCUMENTS

| | | | |
|---|---|---|---|
| 3,964,822 A | 6/1976 | Yamashita | 359/443 |
| 3,998,522 A | 12/1976 | Holzel | 359/451 |
| 4,022,522 A | 5/1977 | Rain | 359/443 |
| 4,089,587 A | 5/1978 | Schudel | 359/451 |
| 4,642,945 A * | 2/1987 | Browning et al. | 359/451 |
| 4,750,808 A | 6/1988 | Nash et al. | 359/451 |
| 5,949,576 A * | 9/1999 | Wilson | 359/443 |
| 5,963,370 A * | 10/1999 | Nakamae | 359/443 |
| 6,128,130 A | 10/2000 | Zobel, Jr. et al. | 359/443 |

* cited by examiner

*Primary Examiner*—Christopher Mahoney
(74) *Attorney, Agent, or Firm*—Gene Scott-Patent Law & Venture Group

(57) ABSTRACT

A projection screen apparatus comprises a support blank of a lightweight, rigid material defining a front face surface having a smooth concave curvature in two orthogonal directions. The front face surface terminates at a mounting rim skirting the front face surface peripherally. A projection screen is fixed to the front face surface of the support blank thereby assuming its doubly concave curvature. A box-like fixture supports the blank while suction is drawn between the front face of the blank and the screen material so as to draw the screen material into intimate contact with the surface of the blank in order to bond the screen to the blank.

10 Claims, 3 Drawing Sheets

DOUBLE CONCAVE SCREEN AND METHOD OF ASSEMBLY

BACKGROUND OF THE INVENTION

1. Field of the Invention

This invention relates generally to projection screens and more particularly to a double concave screen system and method of assembly.

2. Description of Related Art

Images projected onto compound curved reflective surfaces are optically pleasing and more akin to reality. The illusion of size of image is increased, the depth of perception is enhanced and edge distortion is reduced. Projecting images onto curved surfaces is not new, but because of complex problems, such display screens have been limited to cylindrical shapes. It also has been difficult to produce a compound curved display surface that is reflectively dynamic and affordable. Recent technology has advanced the composition of the screen surface, greatly reducing the light bounce problem inherent to curved screens. Advances in the molding process and molding materials have also advanced to a point where compound curved screens are practical and affordable. It is desirable to provide a relatively large compound curved display screen for mass audiences that can be easily and inexpensively fabricated. It is further desirable for the large compound curved screen to occupy a minimum amount of space and to be installed with the least amount of interference with existing structures. There is a further need to provide a compound curved screen for the smaller audience such as the school or home that can be inexpensively molded, occupy a minimum amount of space, be lightweight and easily portable.

Yamashita, U.S. Pat. No. 3,964,822 describes a projection screen including a substrate having a metallic aluminum surface and a transparent film overlay. The metallic aluminum surface is provided with a pattern of directional irregularities and a pattern of craters. The projection screen is produced by subjecting an aluminum surface to a mechanical surface treatment to form a dense pattern of fine irregularities, etching the treated surface to form a crater pattern thereon and coating the resulting surface with a protective transparent film.

Holzel, U.S. Pat. No. 3,998,522 describes a screen such as those generally used for exhibiting projected images. A boxlike frame has a rim formed about its front. A membrane (the projection screen) covers the front with its margin extending to the vicinity of the rim. A cover encloses the back of the frame and is connected in sealed engagement to the margin of the membrane so as to form a plenum. Gas is withdrawn from the plenum whereby the membrane forms a concave image receiving surface curved in a relatively constant degree about a single point so that the image receiving surface takes on a spherical shape.

Rain, U.S. Pat. No. 4,022,522 describes a tailored membrane supported solely by a peripheral frame forms the front panel of a chamber. A source of vacuum or an air blower maintains a pressure in the chamber which differs from that of the ambient atmosphere. As a result, the tailored membrane is either drawn forward or pushed taut to provide a concave or convex viewing surface having a configuration determined solely by its tailoring.

Schudel, U.S. Pat. No. 4,089,587 describes an improved projection screen. The screen includes a film which is constructed of at least partially deformable, resilient material. One surface of the film has in combination a random matte texture and a substantially unidirectional striated texture. A layer of reflective material is deposited on the above-mentioned surface of the film to provide a high gain, damage resistant reflective surface. In one embodiment of the present invention, the layer of reflective material is located on the back surface of the film, and the front surface has a matte texture so that light from a projector or other source passes through the matte surface of the film to be reflected by the layer of reflective material on the back surface thereof. In another embodiment of the present invention, the layer of reflective material is located on the front surface of the film so that light projected on the screen is reflected by the layer of reflective material without passing through the film.

Nash et al., U.S. Pat. No. 4,750,808 describes a projection screen including a rectangular film having a back surface, a front surface and a periphery, a support frame and chamber connected to the periphery of the film for defining the shape of the periphery of the film, a device for creating a pressure differential between the front surface and the back surface of the film, a sensor for sensing the position of the film and indirectly sense the pressure differential on the film and a controller for controlling the device for creating the pressure differential in response to the sensor such that the position of the film is a predetermined position as a result of some pressure differential whereby the shape of the film is set by the shape of the frame which is connected to the periphery of the film and by the predetermined position of the film resulting from the pressure differential.

Zobel, Jr. et al., U.S. Pat. No. 5,128,130 describes a projection screen formed from a plurality of translucent fabric panels joined along overlapping peripheral edge portions to produce a reflective, curved front screen surface. Overlapping peripheral edge portions extend outwardly from the back surface of the screen and are configured to be substantially less reflective than the front or projection surface of the screen. Accordingly, the visibility of seams between adjacent fabric panels to a viewer viewing images projected onto the screen is diminished.

The prior art teaches the use of curved projection screens but does not teach a double concave screen mounted onto a lightweight and rigid blank and a method of assembly using vacuum suction. The present invention fulfills these needs and provides further related advantages as described in the following summary.

SUMMARY OF THE INVENTION

The present invention teaches certain benefits in construction and use which give rise to the objectives described below.

The present invention addresses the above described needs by providing a compound curved display screen of sufficient dimensions for commercial theaters, conventions, trade shows, etc. The present invention further addresses these needs by providing a compound curved display screen of sufficient dimensions for home theaters, instruction classes, sports lounges, etc. The invention comprises a molded unit having a surface of a toroid. The molded unit is comprised of a material such as polyurethane for both strength and lightweight. Placed on and bonded to the concave surface of the molded component is a reflective screen material with an anti-light bounce feature. The screen is mounted to the peripheral edges of the blank and then stretched and bonded to the toroidal surface of the blank using vacuum suction.

A primary objective of the present invention is to provide an apparatus and method of use of such apparatus that provides advantages not taught by the prior art.

Another objective is to provide such an invention method capable of mounting a flexible screen material to a double concave surface.

A further objective is to provide such an invention capable of preventing light bounce on the surface of the screen.

A still further objective is to provide such an invention comprising a fixture for holding a support blank with a screen stretched across it, and for providing vacuum suction between the support blank and the screen to enable stretch mounting the screen onto the blank.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
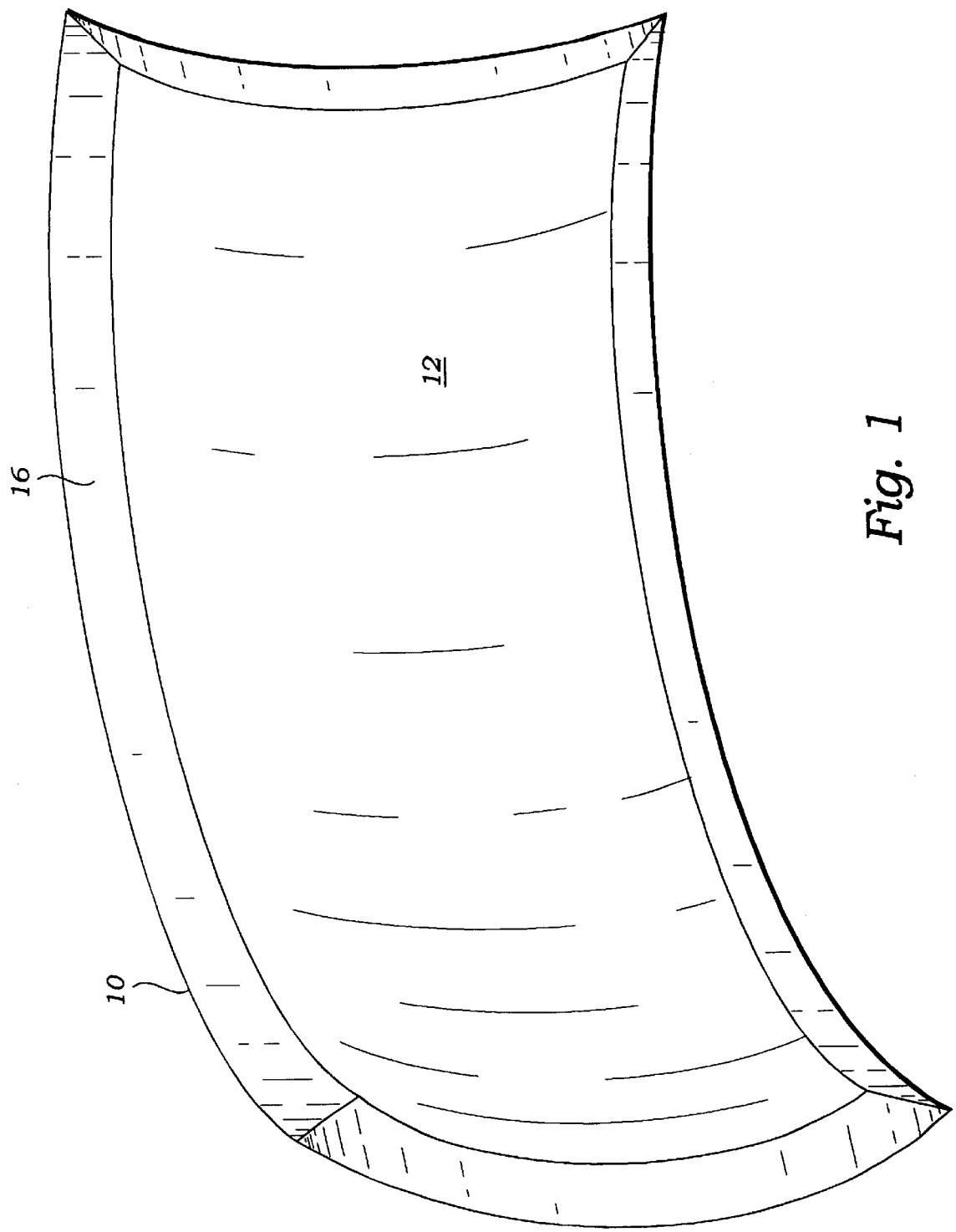
FIG. 1 is a perspective view of a support blank of a preferred embodiment of the invention.
Figure 3:
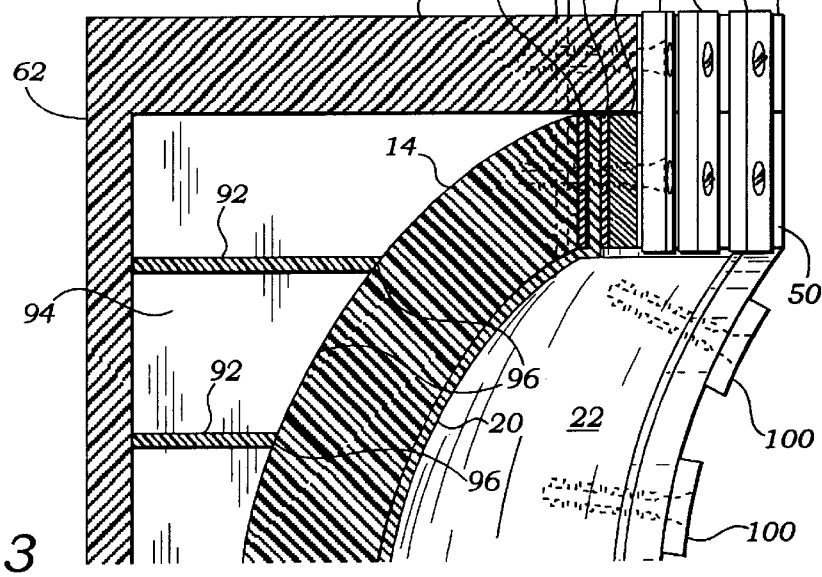
FIG. 3 is a section view thereof taken along line 3—3 in FIG. 2.

A projection screen apparatus comprises a rectangular support blank 10 of a lightweight, rigid material, preferably molded polyurethane, defining a front face surface 12 and a rear surface 14 as shown in FIGS. 1 and 3. The front face surface 12 has a smooth concave curvature in two orthogonal directions, i.e. from top to bottom and from left to right, and both are preferably arcs of a sphere, but may alternately be aspherical. The radius of curvature in the horizontal direction is generally greater than that in the vertical as is clear from FIG. 1. This surface 12 terminates at a mounting rim 16 skirting the front face surface 12 peripherally, i.e., as shown in FIG. 1, running along the top, bottom and both side edges. A projection screen 20 of polyvinyl chloride or similar material which is stretchable and gas impermeable, is bonded to the front face surface 12 of the support blank 10 so that it intimately assumes the concave curvature of the front face surface 12. This intimate contact is shown in FIG. 3. An anti-light-bounce coating 26, well known to one of skill in the art, is placed on an outfacing surface 22 of the projection screen 20 for reducing light reflection or bounce which tends to wash-out the images projected onto the screen 20 because it is curved.

Figure 2:
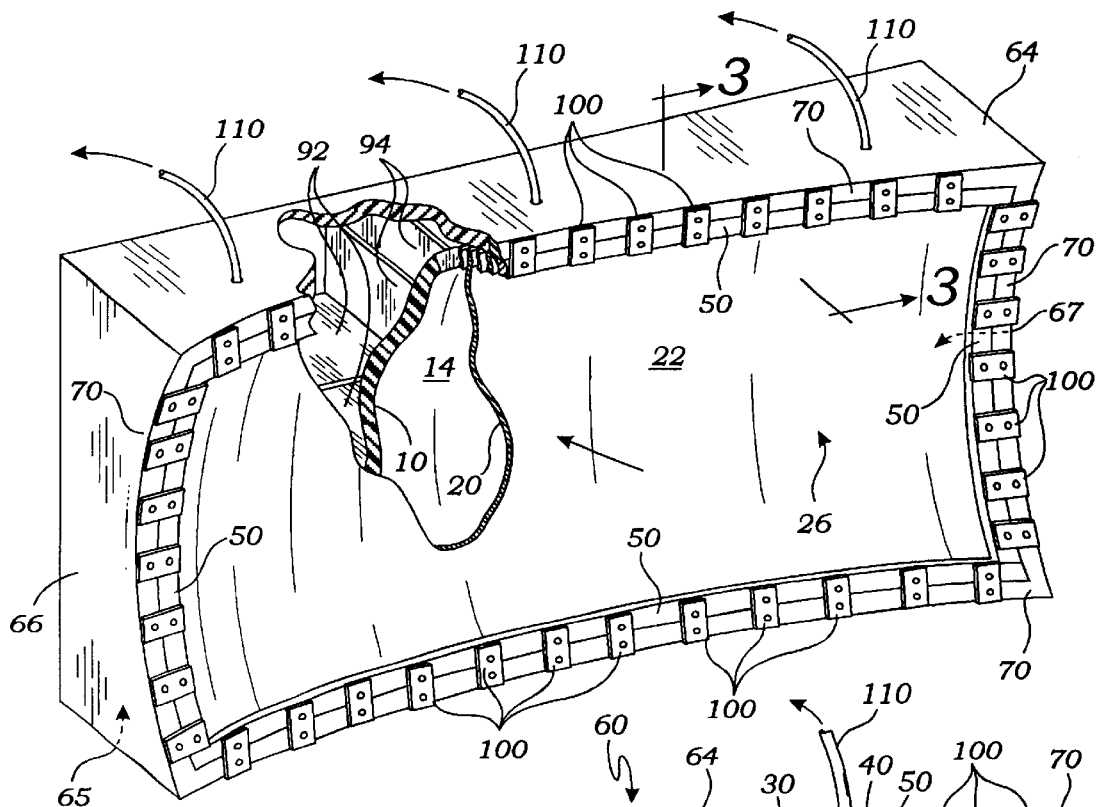
FIG. 2 is a cutaway perspective view of the support blank with screen stretched across it, mounted in a fixture of the invention.
Figure 4:
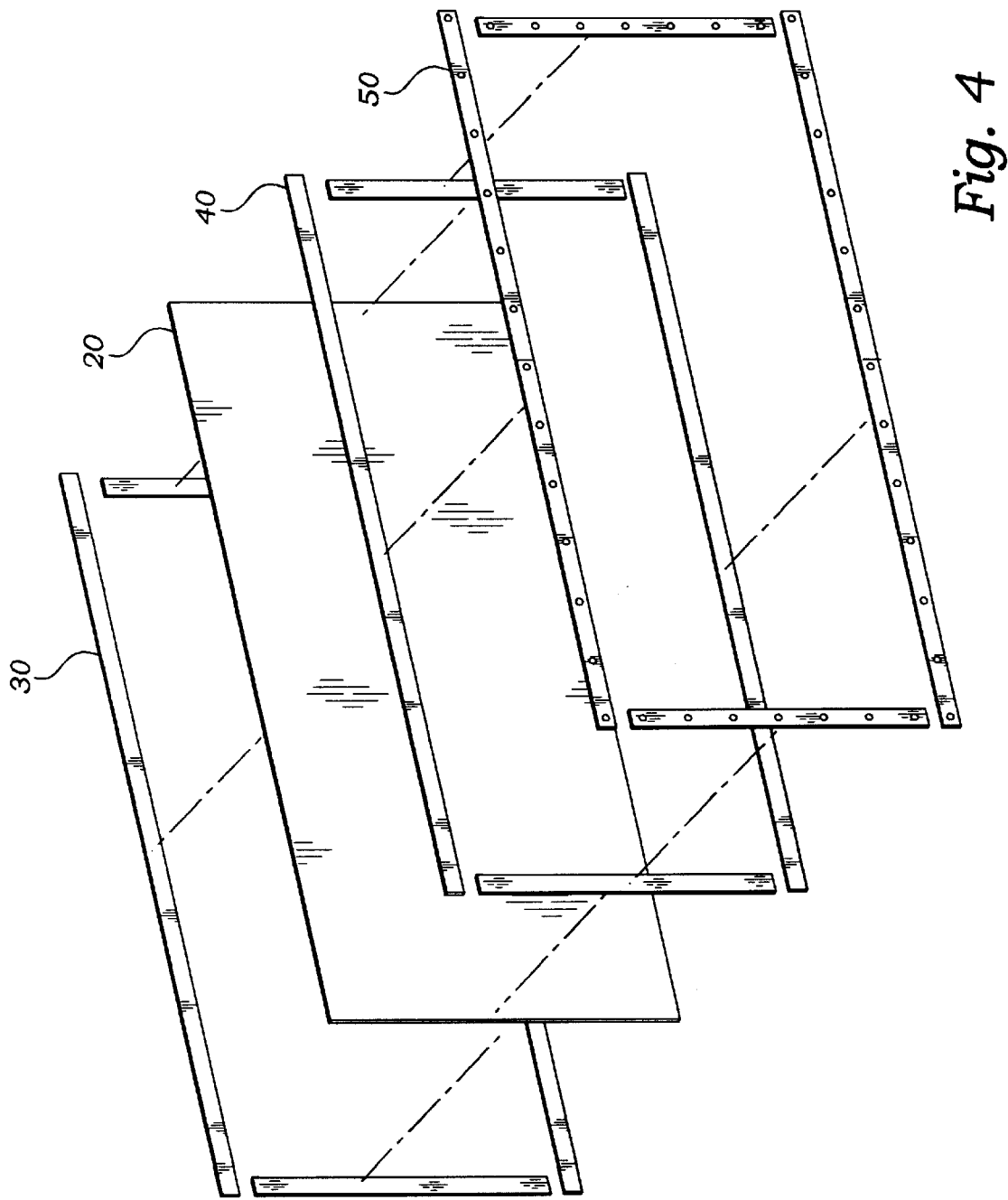
FIG. 4 is perspective view of an inner gasket, screen, outer gasket, fascia strip and mounting frame thereof wherein the gaskets and fascia strip are shown as each comprising a set of four separate pieces.

Preferably, an inner gasket seal 30, of a rubber or similar material, is placed between the projection screen 20 and the mounting rim 16 and is bonded to both the screen 20 and the mounting rim 16. An outer gasket seal 40, similar to the inner seal 30, is placed and bonded between the screen 20 and a peripheral facia 50. The facia 50 may be made in one piece or in separate pieces as is shown in FIG. 4. When made in separate pieces, the facia 50 comprises 4 plastic or wood strips of a flexible nature so as to be able to conform to the surfaces of the mounting rim 16. The seals 30 and 40 also may be made in one piece (not shown) each forming a four sided frame structure, or, as shown in FIG. 4, they may be madeup of separate top, bottom and side portions. The facia 50 is preferably strips of wood, plastic or metal placed in congruence with the mounting rim 16 as shown in FIG. 2. Preferably 3M Co., Fast Bond 30-NF® adhesive, or its equivalent, is used to bond items 20, 30, 40 and 50 together., These seals 30, 40, prolong the life of the apparatus and prevent separation of the screen 20 from the blank 10.

Preferably, the invention further comprises, in combination with the above described projection screen apparatus 5, a blank supporting structure 60 made up, as shown in FIGS. 2 and 3, of a back panel 62 fastened to top panel 64, bottom panel 65, and left and right side panels 66, 67. Such panels may comprise solid surfaces or framework construction. Those of skill in the art will know how to construct structure 60 in the foregoing or alternative ways. The supporting structure 60 has a double concave, open rectangular front edge 70 corresponding in shape to the mounting rim 16 of the support blank 10 and it is positioned peripherally adjacent thereto when the blank is cradled within the structure 60. The supporting structure 60 also provides a strut network configured and engaged within the structure 60 for the purpose of supporting the blank 10 and rigidizing the structure 60. The box strut network is made up of a plurality of ribs 92 positioned in mutually parallel juxtaposition horizontally, and a plurality of stringers 94 positioned in mutually parallel juxtaposition vertically. The ribs 92 and stringers 94 are mutually engaged for common support, and are further engaged with the structure 60 as shown in FIG. 2 in the broken section, and also in FIG. 3. The ribs 92 and stringers 94 provide contour surfaces 96 which are positioned for contact with the rear surface 14 of the support blank 10 for physical support when the blank 10 is mounted within the support structure 60, preferably with the surface 12 facing upwardly.

The present invention defines a method of manufacturing the projection screen apparatus 5 using the supporting structure 60. The support blank 10 defined above is molded with the double concave front face surface 12 and with the mounting rim 16, where the rim skirts the front face surface 12 peripherally as shown in FIG. 1 and previously described. Next, the inner sealing gasket 30 is bonded to the rim 16 of the support blank 10 and the projection screen 20 is laid across and bonded to the inner sealing gasket 30. The outer sealing gasket 40 and the fascia 50 are then bonded to the outer surface 22 of the screen 20. The outer sealing gasket 40 is fastened over the screen 20 and fasteners are driven into the mounting rim 16 of the support blank 10 so that the projection screen 10 encloses the front face surface 12 of the support blank 10 and the volume covered by the screen 10 is closed and sealed. the support blank 10 is then mounted within the blank supporting structure 60 with the facia 50 positioned adjacent peripherally to the open rectangular front edge 70 of the supporting structure 70, and in a position contiguous thereto. The rear surface 14 of the blank 10 rests against the contoured surfaces 96 of the ribs 92 and spars 94 and preferably the front surface 12, and the screen both face upwardly. Flat straps 100, which are made of a rigid metal, or equivalent, are then fastened in place as shown in FIG. 2 using common fasteners driven into the mounting rim 16, through inner and outer sealing gaskets as well as the screen 20, and also into the front edge 70 of structure 60, so that the blank 10 with the screen 20 in place, is secured within structure 60. The infacing surface of the projection screen and/or the front face surface 12 of the support blank is coated with a bonding agent of a suitable type. Suction is applied to the space between the projection screen 20 and the support blank 10 so as to draw the projection screen 20 into close and intimate contact with the front face surface 12 of the support blank 10 and enable bonding of the screen 20 to the blank 10. This is achieved through the reduction of air pressure within the enclosure so that standard atmospheric pressure, (approximately 14.8 pounds per square inch) is applied to the exterior surface of the projection screen 20, thereby pressing it inwardly into contact with the front face surface 12 of the support blank 10. Suction is maintained until the bonding of the screen to the blank is completed.

An important aspect of the structure of the present invention which enables the screen 20 to be sealed, is the use of the two gaskets 30, 40 as defined above, so that placement and engagement of these gaskets is a necessary part of the present method to assure a tight peripheral seal to hold suction. Application of suction, the methods and means of such being very well known in the art, is applied through plural tubes 110 mounted peripherally in the blank 10 as shown in FIG. 3. Peripheral suction has been discovered to provide an improved result as the screen 20 is stretched from a starting position where its four edges describe arcs, and the screen material laying between these four edges is stretched between the edges and the final position where the screen is bonded to the surface 12. Air pressure forces the screen material to stretch and move into contact with the surface 12 of the blank 10 in an even and wrinkle free condition.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A projection screen apparatus comprising: a support blank of a lightweight, rigid material defining a front face surface, the surface having a smooth concave curvature in two orthogonal directions, the front face surface terminating at a mounting rim skirting the front face surface peripherally; a projection screen fixed to the front face surface of the support blank thereby assuming the concave curvature of the front face surface; and an anti-light-bounce coating on an outfacing surface of the projection screen for reducing light reflection therefrom.

2. The apparatus of claim 1 further comprising an inner gasket seal bonded peripherally between the projection screen and the mounting rim of the support blank.

3. The apparatus of claim 2 further comprising an outer gasket seal and a peripheral facia, the outer gasket seal bonded peripherally between the outfacing surface of the projection screen and the peripheral facia positionally over the mounting rim of the support blank.

4. A projection screen apparatus and mounting frame comprising in combination: a support blank of a lightweight, rigid material defining a front face surface, the surface having a smooth concave curvature in two orthogonal directions, the front face surface terminating at a mounting rim skirting the front face surface peripherally; a projection screen bonded to the front face surface of the support blank thereby assuming the concave curvature of the front face surface; and a anti-light-bounce coating on an outfacing surface of the projection screen for reducing light reflection therefrom; a blank supporting structure having a double concave, peripheral rim corresponding to the mounting rim of the support blank and positioned laterally peripherally adjacent thereto and contiguous therewith, the blank supporting structure adapted for receiving the support blank therein and for applying suction for drawing the projection screen into contact with the front face surface of the support blank.

5. The apparatus of claim 4 further comprising a primary gasket seal between the projection screen and the mounting rim, the projection screen bonded to the primary gasket seal and the primary gasket seal bonded to the mounting rim.

6. The apparatus of claim 5 further comprising a secondary gasket seal and a peripheral facia, the secondary gasket seal bonded to the outfacing surface of the projection screen over the mounting rim and the peripheral facia bonded to the secondary gasket seal over the mounting rim.

7. A method of manufacturing a projection screen apparatus using a mounting frame comprising the steps: providing a blank supporting structure having a double concave, open rectangular strut assembly; molding a support blank of a lightweight, rigid material with a double concave front face surface; fabricating a mounting rim on the support blank, the rim skirting the front face surface peripherally; mounting the support blank within the blank supporting structure with the rim of the support blank adjacent peripherally to the open rectangular strut assembly and contiguous thereto; positioning the blank supporting structure in contact with a rear surface of the support blank for physical support thereof; fastening a projection screen to the mounting rim of the support blank so that the projection screen encloses the front face surface of the support blank; fastening the mounting rim to the open rectangular strut assembly; coating at least one of an inside surface of the projection screen and the front face surface of the support blank with a bonding agent; and applying a suction to a space between the projection screen and the support blank so as to draw the projection screen into close contact with the front face surface of the support blank for bonding the screen to the blank.

8. The method of claim 7 comprising the further step of engaging a primary gasket seal between the projection screen and the mounting rim.

9. The method of claim 8 comprising the further step of engaging a secondary gasket seal between a peripheral facia and the projection screen.

10. The method of claim 7 wherein the suction is applied peripherally.

\* \* \* \* \*